United States Patent [19]
Emalfarb

[11] Patent Number: 6,058,647
[45] Date of Patent: May 9, 2000

[54] MOISTURE CONTENT INDICATOR SYSTEM FOR GROWING MEDIUM

[76] Inventor: Bradley S. Emalfarb, 763 Bunker Ct., Riverwoods, Ill. 60015

[21] Appl. No.: 08/943,651

[22] Filed: Oct. 3, 1997

[51] Int. Cl.⁷ ........................................................ G01N 5/02
[52] U.S. Cl. ................................ 47/1.01 R; 47/48.5 CR; 47/80; 73/73
[58] Field of Search ..................... 47/1.01 R, 80, 47/81, 73, 48.5 CR, 79 CR; 73/73

[56] References Cited

U.S. PATENT DOCUMENTS

| | | |
|---|---|---|
| 1,231,976 | 7/1917 | Weitzel . |
| 3,019,638 | 2/1962 | Klein ............................................. 73/73 |
| 3,117,442 | 1/1964 | Brooks ......................................... 73/73 |
| 3,702,755 | 11/1972 | Palmer ........................................ 422/55 |
| 3,739,523 | 6/1973 | Tuffli ........................................... 47/81 |
| 3,758,987 | 9/1973 | Crane, Jr. . |
| 3,867,837 | 2/1975 | Malin ......................................... 19/101 |
| 3,881,873 | 5/1975 | Klowden .................................... 422/56 |
| 4,087,938 | 5/1978 | Koch . |
| 4,121,608 | 10/1978 | MacLeod . |
| 4,130,012 | 12/1978 | Lockerby et al. .......................... 73/73 |
| 4,171,593 | 10/1979 | Bigglestone ................................ 47/79 |
| 4,184,445 | 1/1980 | Burrows ................................... 116/206 |
| 4,300,309 | 11/1981 | Mincy . |
| 4,336,666 | 6/1982 | Caso . |
| 4,782,627 | 11/1988 | Hauk . |
| 4,805,342 | 2/1989 | Jenkins et al. . |
| 5,097,626 | 3/1992 | Mordoch . |
| 5,647,170 | 7/1997 | Holtkamp, Jr. .............................. 47/81 |

FOREIGN PATENT DOCUMENTS 2747348  4/1978  Germany .......................... 47/48.5 CR

OTHER PUBLICATIONS

PCT/EP85/00559 (International Application).

*Primary Examiner*—Peter M. Poon
*Assistant Examiner*—Judith A. Nelson
*Attorney, Agent, or Firm*—Wood, Phillips, VanSanten, Clark & Mortimer

[57] ABSTRACT

The combination of a growing medium for a horticultural product, a horticultural product within the growing medium, and a sensor having a body made up of a porous material that changes in physical appearance with a change in the amount of moisture retained by the porous material. In an operative state, the first part of the sensor body resides within the growing medium and a second part of the body remains visible to allow a user to ascertain through the appearance of the second part of the sensor the amount of moisture in the growing medium.

21 Claims, 3 Drawing Sheets

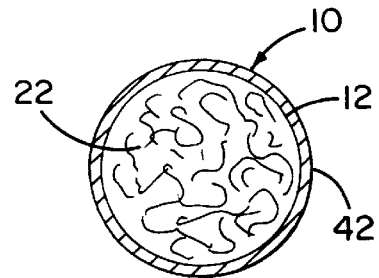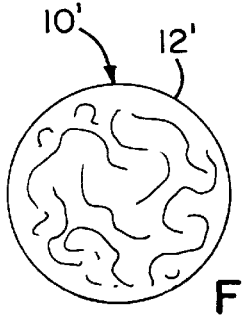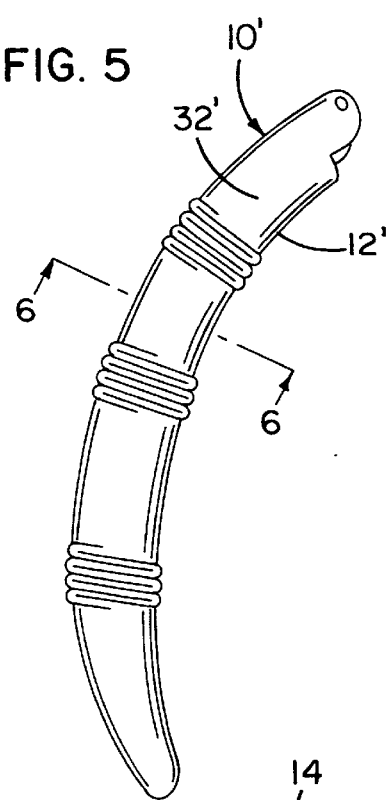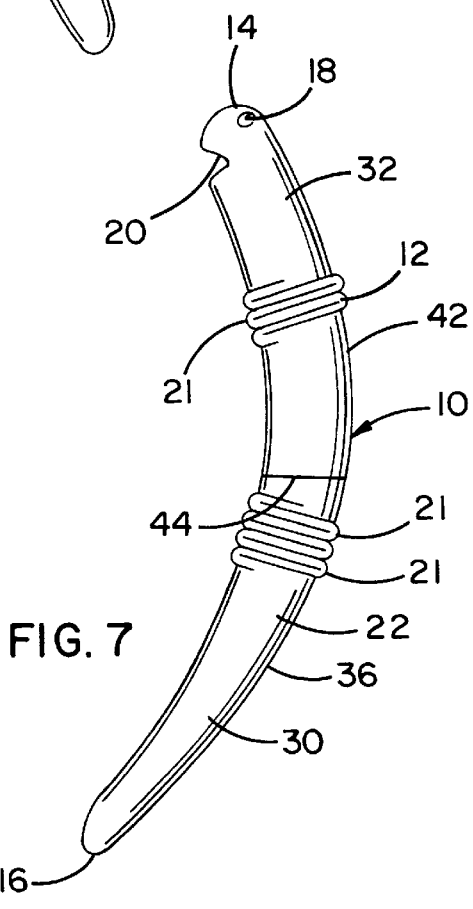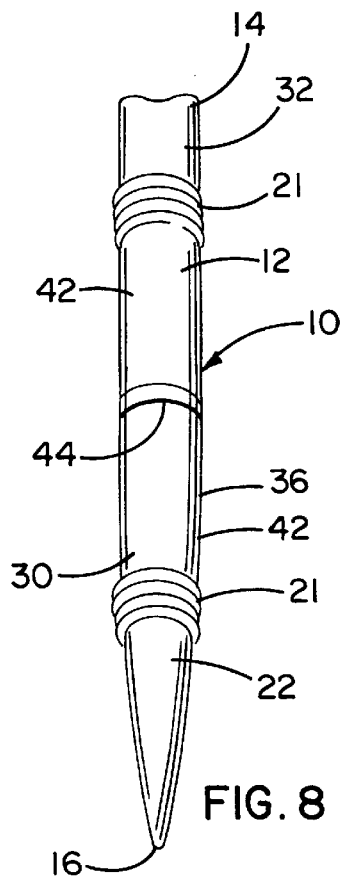

MOISTURE CONTENT INDICATOR SYSTEM FOR GROWING MEDIUM

BACKGROUND OF THE INVENTION

1. Field of the Invention

This invention relates to horticultural products and, more particularly, to an apparatus for sensing the liquid content in a growing medium for a horticultural product.

2. Background Art

Maintenance of a predetermined moisture content in a growing medium for a horticultural product is key to the healthy growth of the product. A myriad of different ways to maintain a minimum moisture content have been devised.

The most primitive system for maintaining moisture content is to add a predetermined amount of water or other liquid solution to the growing medium at regular time intervals. For example, it is common to water either weekly or biweekly.

However, this system does not take into account climate changes, be they change in temperature or humidity. As a consequence, the moisture content of the growing medium may vary significantly.

These problems have prompted the development of automatic watering systems. One type of system causes a constant drip of moisture into the growing medium. Variation in atmospheric conditions such as temperature and humidity may cause a significant variation in the moisture content over time with this type of system.

Other types of systems monitor the moisture content of the growing medium and automatically cause the delivery of water from a supply once the sensed moisture is below a predetermined level. These systems can become quite complicated and prone to failure. Conduits through which the water flows may restrict. Sensors may become clogged over time and operate ineffectively or altogether fail.

An alternative to systems that automatically sense and deliver moisture is the periodic manual sensing of moisture content. The most basic way of carrying this out is for the user to direct a finger against the growing medium to tactilely sense the degree of moisture. The problem with this is that the moisture cannot be sensed below finger depth. High heat may cause the surface moisture to evaporate while the growing medium maintains a substantial amount of moisture below the surface.

To more accurately sense the moisture content throughout the depth of the growing medium, it is known to use moisture sensing probes. The probes may be dimensioned to penetrate the full depth of the growing medium to give an accurate indication of moisture content even in the deepest portions of the growing medium.

The latter procedure requires that a sensing probe be kept in a convenient location to be accessible when needed. The possibility of losing the probe or not having it handy to observe a particular product is thus present. Probes of this type may represent a significant financial investment. Further, probes of this type may malfunction as after a buildup of foreign matter on, or corrosion of, the metal probe surface which contacts the growing medium.

SUMMARY OF THE INVENTION

In one form, the invention contemplates the combination of a growing medium for a horticultural product, a horticultural product within the growing medium, and a sensor having a body made up of a porous material that changes in physical appearance with a change in the amount of moisture retained by the porous material. In an operative state, the first part of the sensor body resides within the growing medium and a second part of the body remains visible to allow a user to ascertain through the appearance of the second part of the sensor the amount of moisture in the growing medium.

The second part of the body may be made from the porous material.

The porous material may be a clay material.

The porous material may be visible on only a discrete portion of the body.

The body may be made substantially entirely from porous material, with a coating being provided on part of the body and not over the discrete portion which is visible to the user.

In one form, the growing medium has an upper surface and with the sensor in the operative state the second part of the body projects to above the upper surface of the growing medium.

The sensor may have at least a portion that simulates at least one of an animate and an inanimate object. With a simulation of an animate object, the sensor may have simulations of discrete features of the animate object. The discrete portion of the body may coincide with one or more of the discrete features to highlight the same. Exemplary of the discrete features are eyes, a mouth, or the like.

In one form, the portion of the sensor simulates an earth worm. The body may be formed in the shape of an earth worm. The body may be formed arcuately.

In one form, the body has a head end and a tail end, with the head end defining a part of the sensor body and the tail end tapering to a tip which facilitates direction of the tail end of the body into the growing medium.

The head end may have a simulation of at least one of eyes and a mouth.

The body may have spaced circumferentially extending rings thereon to simulate those on an earth worm.

The invention also contemplates a moisture sensor having a body with a porous material that changes in physical appearance with a change in the amount of moisture retained by the porous material. At least part of the body is configured to simulate an animate object. The body has an end which tapers to a tip to facilitate direction of the body into a medium in which moisture content is to be ascertained through the sensor.

BRIEF DESCRIPTION OF THE DRAWINGS

FIG. 4 is a cross-sectional view of the sensor taken along line 4—4 of FIG. 3;

FIG. 5 is a side elevation view of a modified form of sensor, according to the present invention;

FIG. 6 is a cross-sectional view of the sensor taken along line 6—6 of FIG. 5;

FIG. 7 is an elevation view of the sensor taken from the side opposite that in FIG. 3;

FIG. 8 is a rear elevation view of the sensor in FIG. 3;

DETAILED DESCRIPTION OF THE DRAWINGS

Figure 1:
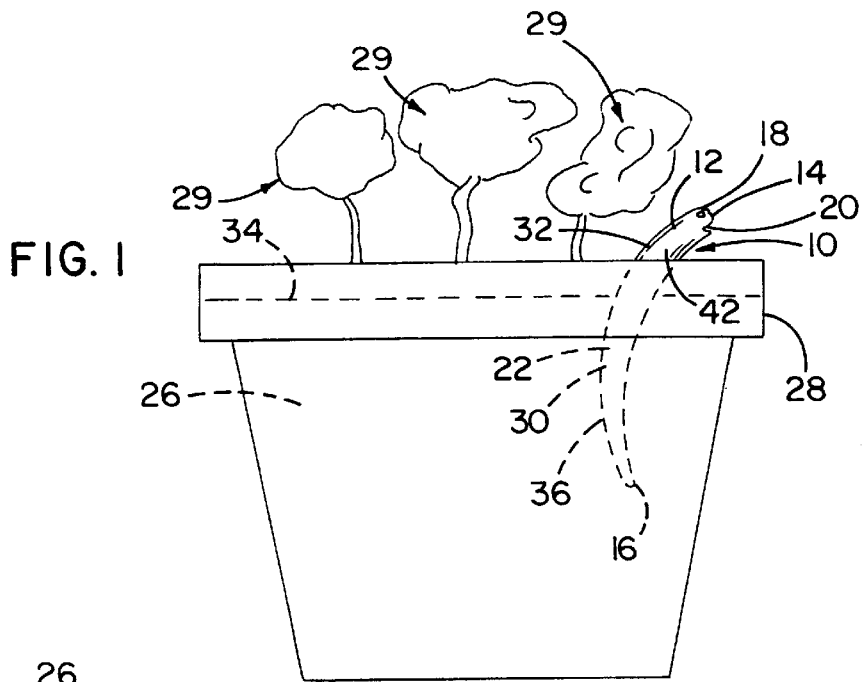
FIG. 1 is a side elevation view of a planter with a horticultural product in a growing medium and a sensor, according to the present invention, in an operative state within the growing medium to sense moisture content therein.

In FIGS. 1–4 and 7–10, one form of sensor, according to the present invention, is shown at 10. The sensor 10 has a body 12 which is configured to simulate an earth worm. The body 12 has a head end 14 and a tail end 16 with an arcuate shape between the head end 14 and tail end 16. The head end 14 has facial features thereon, which in this embodiment are a pair of eyes 18 and a mouth 20. The body 12 tapers progressively towards the tail end 16. Between the ends 14 and 16 are a plurality of circumferentially extending rings 21 so that the body 12 accurately depicts a worm.

The body 12 is made in part from a porous material 22 that changes in physical appearance with a change in the amount of moisture retained by the material. The porous material 22 is selected so that it will absorb and retain water as well as readily wick water through the body 12. A non-metallic mineral, such as clay, serves this purpose as it will darken as moisture is absorbed and wicks through the material.

Figure 2:
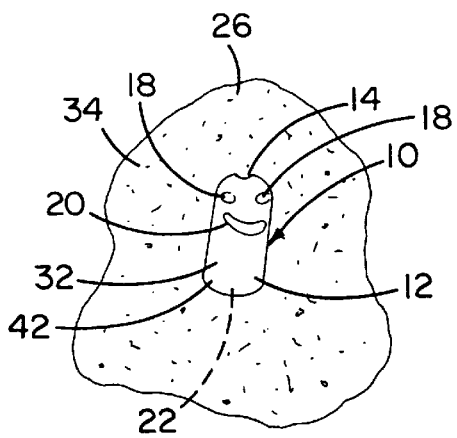
FIG. 2 is a fragmentary, perspective view of the growing medium in FIG. 1 with a part of the sensor projecting therefrom.
Figure 3:
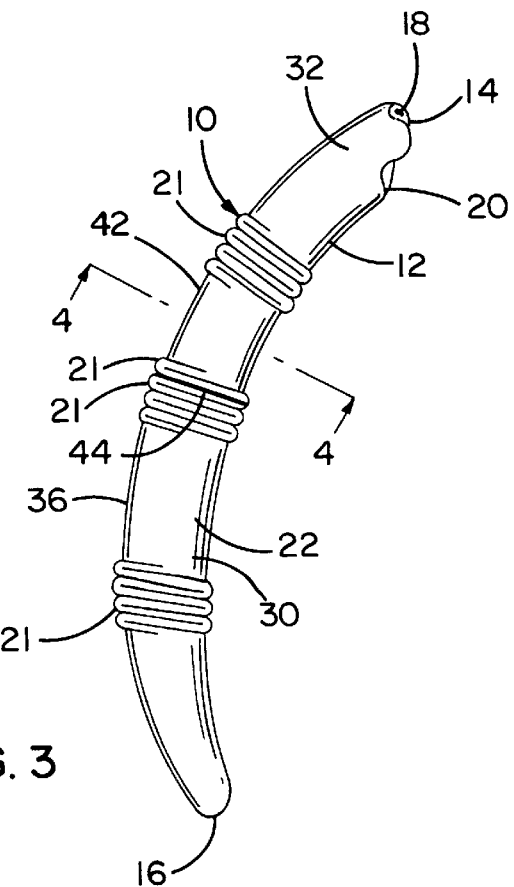
FIG. 3 is a side elevation view of the inventive sensor.

The sensor 10 is shown in FIGS. 1 and 2 in an operative state within a growing medium 26 contained within a conventional receptacle/pot 28. A horticultural product, in this case flowers and plants 29, is rooted in the growing medium 26.

According to the invention, the sensor 10 is directed into the growing medium 26 so that a first part 30 of the body 12 is embedded in the growing medium 26 and a second part 32 of the body projects to upwardly of the upper surface 34 to be readily visible to a user. The tapered configuration of the tail end 16 of the body 12 facilitates insertion of the body 12 into the growing medium so that the operative state for the sensor 10 can be readily achieved.

Figure 9:
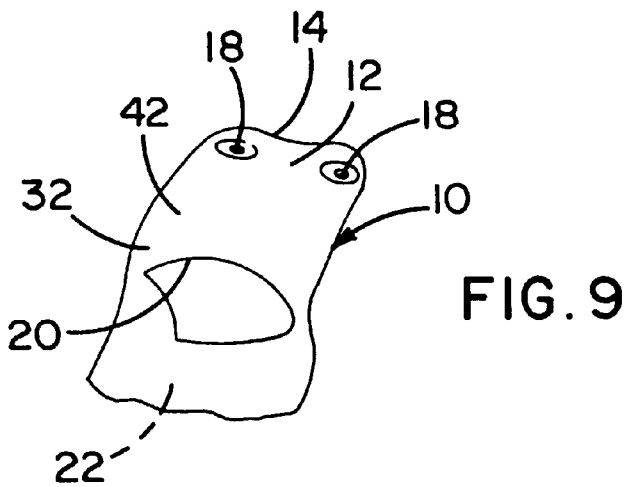
FIG. 9 is a fragmentary, front elevation view of the sensor in FIG. 3 with the sensor having a first amount of moisture retained.
Figure 10:
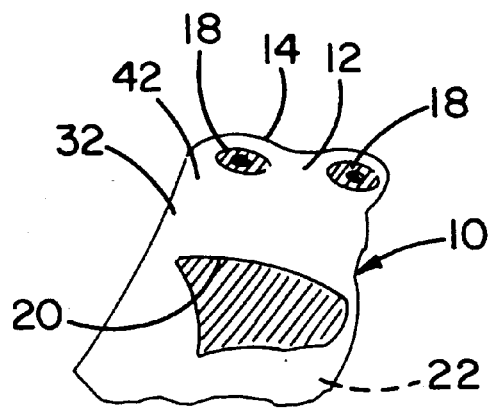
FIG. 10 is a view as in FIG. 9 with an additional amount of moisture retained by the sensor.

In this particular embodiment, the porous material 22 is fully exposed on the periphery 36 of the first part 30 of the body 12. The second part 32 of the body 12 may have a coating 42 thereon that is impervious to water with the color thereof selected to be approximately matched to that of an earth worm. The first part 30 of the body 12, below a dividing line 44 in this embodiment, is uncoated. The coating 42 is applied over the head end 14 of the body 12 but is not applied over the eyes 18 or mouth 20 so that the porous material 22 is exposed thereat. Accordingly, the eye and mouth locations are discrete areas which are uncoated so that water or other liquid absorbed by the porous material 22 that wicks through the body 12 will cause the discrete regions to change color. In FIG. 9, the discrete regions are shown as being very light colored with no or little moisture absorption, whereas in FIG. 10, the same regions are shown to be darkened by reason of additional water being absorbed and retained in the porous material 22.

The sensor 10 can be left in the growing medium 26 at all times and represents an eye-catching, ornamental addition to the horticultural product 29. With the growing medium 26 dry, the discrete regions around the eyes 18 and mouth 20 will be relatively light, thereby informing the user that the moisture content of the growing medium is low. With the discrete regions darkened, the user is advised that more moisture has been absorbed.

In FIGS. 5 and 6, another form of inventive sensor is shown at 10'. The sensor 10' has a body 12' with substantially the same shape as the body 12. The only significant difference is that all or substantially all of the outer surface of the body 12' is uncoated. As a result, the user can detect the moisture content by observing the appearance of the entire second part 32' of the body projecting to above the upper surface 34 of the growing medium 26.

Figure 11:
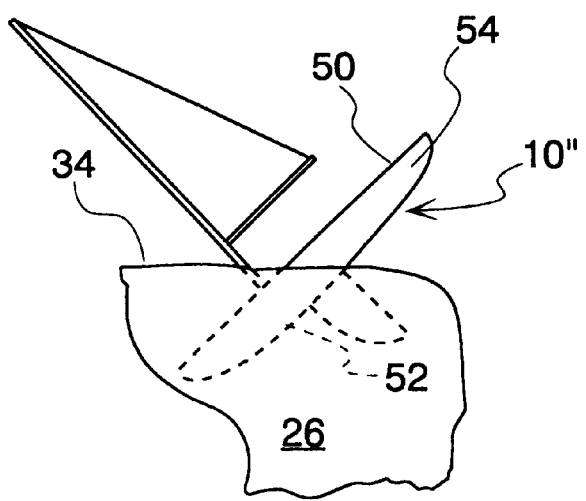
FIG. 11 is a fragmentary, side elevation view of a growing medium with a modified form of sensor, according to the present invention, in an operative state within the growing medium to sense moisture content therewithin.

In FIG. 11, another modification of the invention is shown. In FIG. 11, a sensor 10" is shown, which is configured to simulate an inanimate object, in this case a sailing vessel 50. Part or all of the vessel 50 can be made from a porous material which changes colors depending upon the amount of moisture retained thereby. The part 52 of the sensor 10" embedded in the growing medium 26 absorbs and retains water, which is wicked through to the sensor part 54 projecting to above the upper surface 34 of the growing medium 26.

With the inventive structure, the user can conveniently place the sensors 10, 10', 10" in the operative state by a simple pressing operation. The sensors 10, 10', 10" serve the dual purposes of aesthetically contributing to the overall appearance of the horticultural arrangement within the growing medium 26 and giving the user a visual indication of the moisture content in the growing medium. The invention lends itself to affordable manufacture so that sensors 10, 10', 10" can be provided in a large number of arrangements without an excessive financial investment.

The foregoing disclosure of specific embodiments is intended to be illustrative of the broad concepts comprehended by the invention.

What is claimed is:

1. In combination:

a growing medium for a horticultural product;

a horticultural product within the growing medium; and a sensor having a body comprising a porous material that changes in physical appearance with a change in the amount of moisture retained by the porous material, the sensor being in an operative state wherein a first part of the sensor body resides within the growing medium and a second part of the body projects from the growing medium and remains visible to allow a user to ascertain through the appearance of the second part of the sensor body the amount of moisture in the growing medium, the second part of the sensor body having at least a portion that simulates at least a part of at least one of an animate or an inanimate object with a contoured outer surface having a three-dimensional shape corresponding to the shape of the at least one of the animate or inanimate object, the contoured outer surface defined by the porous material and having no chemical therein or thereon that reacts in the presence of moisture to change color, whereby the appearance of the contoured outer surface of the second part of the sensor body corresponding to the shape of the at least one of the animate or inanimate object changes depending only upon the amount of moisture in the growing medium and thereby retained by the porous material.

2. The combination according to claim 1 wherein the porous material defines substantially the entirety of the at least one of the animate or inanimate object.

3. The combination according to claim 1 wherein the porous material comprises a clay material.

4. The combination according to claim 1 wherein the growing medium has an upper surface and with the sensor in the operative state the second part of the body projects to above the upper surface of the growing medium.

5. The combination according to claim 1 wherein the porous material is exposed and visible on only a discrete portion of the body.

6. The combination according to claim 5 wherein the body is made substantially entirely from a porous material, there is a coating on part of the body, and the coating is not provided over the discrete portion of the body.

7. The combination according to claim 6 wherein the at least portion simulates an animate object with a feature thereon for the animate object and the discrete portion of the body coincides with the feature to highlight the feature.

8. The combination according to claim 7 wherein the feature comprises at least one of an eye and a mouth.

9. The combination according to claim 7 wherein the portion of the sensor simulates an earth worm.

10. The combination according to claim 1 wherein the sensor body is formed in the shape of an earth worm.

11. The combination according to claim 10 wherein the body is formed in a generally arcuate shape.

12. The combination according to claim 10 wherein the body has a head end and a tail end, the head end defines the first part of the sensor body and the tail end tapers to a tip which facilitates direction of the tail end of the body into the growing medium.

13. The combination according to claim 12 wherein the head end has a simulation of at least one of eyes and a mouth thereon.

14. The combination according to claim 10 wherein the body has a plurality of circumferentially extending rings thereon.

15. A moisture sensor comprising:

a body that changes in physical appearance with a change in the amount of moisture retained by the porous material and having spaced first and second ends, the first end of the body tapering to a tip to facilitate direction of the first body end into a medium in which moisture content is to be ascertained through the sensor, wherein the body comprises a rigid, porous material which extends from the first end to the second end and is capable of absorbing and wicking moisture between the first and second ends, whereby the first end of the body can be directed into a medium so as to leave the second end exposed to view outside of the medium, whereby relative amounts of moisture in a medium within which the first end resides can be ascertained by the physical appearance of the second end, the second end having a contoured outer surface that simulates in three dimensions at least a part of at least one of an animate or inanimate object, the contoured outer surface being defined by the porous material and having no chemical therein or thereon that reacts in the presence of moisture to chance color, whereby the appearance of the contoured outer surface of the second end of the sensor body that simulates the at least part of the at least one of the animate or inanimate object changes depending only upon the amount of moisture in the growing medium and thereby retained by the porous material.

16. The moisture sensor according to claim 15 wherein the at least part of the body is configured to simulate an earth worm.

17. The moisture sensor according to claim 15 wherein the entire body is configured to simulate an earth worm, and the end of the body that tapers to a tip simulates the tail of an earth worm.

18. The moisture sensor according to claim 17 wherein the body has an arcuate shape.

19. The moisture sensor according to claim 17 wherein the body has a head end with a simulation of at least one of eyes or a mouth.

20. The moisture sensor according to claim 15 wherein substantially the entire body is made from a clay material.

21. The combination according to claim 1 wherein the porous material has a first color in one state and the first color darkened with the porous material in a second state wherein more moisture is retained in the porous material than with the porous material in the one state.

* * * * *